(12) United States Patent
Jagannathan et al.

(10) Patent No.: US 8,046,487 B2
(45) Date of Patent: Oct. 25, 2011

(54) METHOD FOR ROUTING OF DATA PACKETS AND ROUTING APPARATUS

(75) Inventors: Sankar Narayan Jagannathan, Jayangar (IN); Xiaoning Nie, Neubiberg (DE); Jinan Lin, Ottobrunn (DE)

(73) Assignee: Infineon Technologies AG, Neubiberg (DE)

( * ) Notice: Subject to any disclaimer, the term of this patent is extended or adjusted under 35 U.S.C. 154(b) by 197 days.

(21) Appl. No.: 10/524,311

(22) PCT Filed: Aug. 5, 2003

(86) PCT No.: PCT/EP03/08663
§ 371 (c)(1),
(2), (4) Date: Nov. 21, 2005

(87) PCT Pub. No.: WO2004/015933
PCT Pub. Date: Feb. 19, 2004

(65) Prior Publication Data
US 2006/0106940 A1    May 18, 2006

(30) Foreign Application Priority Data
Aug. 7, 2002  (EP) .................................... 02017685

(51) Int. Cl.
*G06F 15/173* (2006.01)
*G06F 15/16* (2006.01)
(52) U.S. Cl. ........................ 709/238; 709/218
(58) Field of Classification Search .................. 709/238, 709/239, 218; 711/202
See application file for complete search history.

(56) References Cited

U.S. PATENT DOCUMENTS
5,477,547 A * 12/1995 Sugiyama ..................... 370/401
(Continued)

FOREIGN PATENT DOCUMENTS
EP        0 978 966 A1    2/2000

OTHER PUBLICATIONS

Henry Hong-Yi Tzeng et al., "On Fast Address-Lookup Algorithms", IEEE Journal on Selected Areas in Communications, Jun. 1999, XP002936422, pp. 1067-1082, (16 pages).

(Continued)

*Primary Examiner* — Kenny Lin
*Assistant Examiner* — Shaq Taha
(74) *Attorney, Agent, or Firm* — Maginot, Moore & Beck

(57) ABSTRACT

In order to be able to use a smaller routing table (4) and, thus, to reduce the costs and power consumption and to improve the performance of an IP router, it is proposed to extract a destination address identifier (ADR) from a data packet to be forwarded by the IP router, compress the extracted destination address identifier (ADR) by using a lossless data compression algorithm, and compare the compressed destination address identifier with entries stored in the routing table (4) so as to find a correspondence between the destination address identifier and one of the entries of the routing table (4). Each entry of the routing table (4) corresponds to a possible or available forwarding address of the IP router, the forwarding addresses having been compressed with the same data compression algorithm as the destination address identifier. After having found a correspondence between the destination address identifier and one of the compressed forwarding addresses stored in the routing table (4), a switch (6) of the IP router switches the respective data packet to one of its output links (OUT) which is associated with the respective forwarding address matching the destination address identifier (ADR).

19 Claims, 4 Drawing Sheets

U.S. PATENT DOCUMENTS

| | | | | |
|---|---|---|---|---|
| 5,613,069 | A * | 3/1997 | Walker | 709/238 |
| 5,841,989 | A * | 11/1998 | James et al. | 709/239 |
| 5,842,224 | A * | 11/1998 | Fenner | 711/202 |
| 5,862,344 | A * | 1/1999 | Hart | 709/238 |
| 6,026,198 | A * | 2/2000 | Okada | 382/247 |
| 6,094,431 | A * | 7/2000 | Yamato et al. | 370/395.21 |
| 6,295,276 | B1 * | 9/2001 | Datta et al. | 370/218 |
| 6,883,079 | B1 * | 4/2005 | Priborsky | 711/170 |
| 7,289,502 | B1 * | 10/2007 | Gemelli et al. | 370/392 |
| 2002/0174203 | A1 * | 11/2002 | Kuhn et al. | 709/220 |
| 2003/0033430 | A1 * | 2/2003 | Lau et al. | 709/245 |
| 2003/0081554 | A1 * | 5/2003 | Huang et al. | 370/238 |
| 2003/0222996 | A1 * | 12/2003 | Patej | 348/255 |
| 2006/0075134 | A1 * | 4/2006 | Aalto et al. | 709/238 |

OTHER PUBLICATIONS

Witten et al., "Arithmetic Coding for Data Compression", Communications of the Association for Computing Machinery, vol. 30, No. 6, Jun. 1987, XP000615171, pp. 520-540, (21 pages).

* cited by examiner

FIG 3

| A | B | C |
|---|---|---|
| 0 | 100000 | 6 |
| 1 | 100001 | 6 |
| 2 | 100010 | 6 |
| 3 | 110110 | 6 |
| 4 | 110111 | 6 |
| 5 | 10010 | 5 |
| 6 | 10011 | 5 |
| 7 | 10100 | 5 |
| 8 | 10101 | 5 |
| 9 | 10110 | 5 |
| A | 10111 | 5 |
| B | 11010 | 5 |
| C | 1100 | 4 |
| D | 111 | 3 |
| E | 0 | 1 |
| F | 1 | 1 |

FIG 4

FF4BFF37FFFEFFFDFFFEFFFEFFFDFFFD

FIG 5

| A | B | C | D | E |
|---|---|---|---|---|
| 1 | 814464 | 13031424 | 6081706 | 53.33 |
| 2 | 678720 | 10859520 | 5028230 | 53.69 |
| 3 | 329664 | 5274624 | 2414228 | 54.22 |
| 4 | 193920 | 3102720 | 1394411 | 55.05 |
| 5 | 84840 | 1357440 | 589504 | 56.57 |

METHOD FOR ROUTING OF DATA PACKETS AND ROUTING APPARATUS

FIELD OF THE INVENTION

The present invention relates to a method for routing of data packets as well as a respective routing apparatus. In particular, the present invention relates to a method for routing of data packets according to the IPv6 protocol ("Internet Protocol Version 6") and a respective routing apparatus.

BACKGROUND

As one of the essential components of an internet data transmission system, an IP router ("Internet Protocol") makes a forwarding decision for an input data packet, i.e. it checks a destination address identifier carried in the packet header and directs it to the next output port or output link through which the data packet should be sent. For example, depending on the destination address identifier of the input data packet, the IP router can direct the data packet to a Next Hop router or an Egress™ port for transmission over a respective output link. In a computer network, the NHRP protocol ("Next Hop Resolution Protocol") is a protocol which can be used so that a computer sending data to another computer can learn the most direct route to the receiving computer. An Egress™ port is a new type of port used in modern IP routers.

In the following, the routing of data is briefly explained with reference to FIG. 7 which shows the schematic construction of an IP router according to the prior art.

The IP router shown in FIG. 7 comprises an input block 1 which receives a plurality of input data packets over N input links or input ports IN1-INN. The input block 1 serves as an input queue and outputs the received data packets in a "First In First Out" (FIFO) manner. A header extracting block 2 is provided which extracts the packet header from the respective data packet to be transmitted so as to obtain the destination address identifier which is included in the packet header. In addition, the data packet is transferred to an output block 6 which serves as a switch. A routing table 4 stores all possible or available forwarding addresses and the respective output link/port numbers of the router. That is to say the routing table comprises a plurality of entries, each entry corresponding to a respective forwarding address to which a data packet can be forwarded by the IP router. The routing table 4 is generated and updated by a block 5 using routing protocols. In FIG. 7, the routing updates are indicated with reference sign UPD. A routing unit 3 receives the destination address identifier extracted by the header extracting block 2 and uses this destination address identifier as a key for searching for a match in the routing table 4, i.e. the routing unit 3 compares the destination address identifier with every entry corresponding to a respective forwarding address information stored in the routing table 4. If the routing unit 3 finds a correspondence between the destination address identifier and one of the forwarding addresses stored in the routing table 4, the respective output link/port number is transferred to the switch 6, and the switch 6 switches the data packet to a respective one of a plurality of M output links/output ports OUT1-OUTM.

Hence, as long as the routing unit 3 finds a correspondence between the destination address identifier extracted by the header extracting block 2 and at least one of the entries stored in the routing table 4, the respective data packet can be switched to one of the output links OUT1-OUTM. If, however, there is no match for the destination address identifier in the routing table 4, the switch 6 cannot switch the respective data packet to one of the output links, and the data packet cannot be forwarded to its destination.

It is obvious that the cost associated with an IP router of the type shown in FIG. 7 and its performance depend very much on the size of the routing table 4. The routing table 4 consumes silicon area and the look-up procedure consumes time as well as power, especially if the routing table 4 is large.

This problem in particular becomes more and more serious with the fast expansion of internet. The newly introduced IPv6 protocol provides address identifiers comprising 128 bits. Theoretically, for an n-bit destination address identifier, the routing table 4 may have up to $2^n$ entries. Hence, as regards the IPv6 protocol, there is a need for an enormous storing capacity for storing such a large routing table 4. Such a large table size, however, makes the look-up procedure even impractical. Therefore, routing table look-up is regarded as the major bottleneck in today's routers.

The most straightforward method for routing table look-up is to perform a linear searching, i.e. compare the destination address identifier of the input data packet with each entry of the routing table until a correspondence between the address identifier and one of the entries in the routing table is recognized. Although this approach is simple, it is hardly used in actual practice due to its poor performance.

To speed up the look-up procedure, various strategies have been used. The most important ones are the usage of a so-called contents-addressed memory (CAM), the search according to a tree-based data structure, and the usage of so-called hashing strategies. Each of these known strategies has its own advantages and disadvantages. However, all of them are based on a search in the original data domain of the destination address identifier. Thus, all of these strategies require a relatively complex search procedure and a relatively large routing table size.

SUMMARY

Therefore, the object underlying the present invention is to provide a routing method for data packets as well as a respective routing apparatus which allow a smaller size of the routing table and, thus, enable a faster search for a correspondence between the respective destination address identifier and the entries stored in the routing table and decrease the costs associated with the routing table.

This object is achieved by a routing method and a routing apparatus according to embodiments of the present invention.

The basic idea of the present invention is that the routing table look-up can be performed in a compressed domain, i.e., before performing the look-up operation for an input data packet, its destination address identifier is first compressed to remove redundancy. Then, the look-up operation is carried out with the compressed destination address identifier as the key with respect to the routing table, the entries of which having been also compressed in the same manner as the destination address identifier of the input data packet.

Therefore, the look-up operation can be performed with respect to a smaller routing table and, thus, the costs and power consumption associated with the respective router can be reduced, while the performance of the router can be improved.

The compression of the destination address identifier as well as the forwarding address information entries of the routing table is performed according to one and the same data compression algorithm. In particular, a so-called lossless data compression algorithm is used which eliminates redundancy in the data without sacrificing any information content. There are several popular algorithms and variants of them which can be used for lossless compression. The most important examples are those of the Huffman, Arithmetic, and Lempel-Ziv (LZ) family.

Since the compression efficiency depends on the data characteristics of the destination address identifiers which the router deals with, parameters of the respective compressor, e.g. the code table, should be assigned or adjusted according to these characteristics.

As regards the data compression algorithm, a data compression algorithm can be used which utilizes a code table which assigns a symbol of the address information to be compressed a respective code word. Each code word has preferably a length which is inversely proportional to the appearance probability of the respective symbol in a given address table, for example an IPv6 address table. As a matter of course, the appearance probability of the symbols at the router input may also be considered to improve the overall performance.

By applying the above-mentioned data compression algorithm, the redundancy of the appearance distribution of some symbols or bit combinations in the destination address identifier is taken into account. Therefore, a kind of a spatial redundancy can be removed. However, there can still be other kinds of redundancy, e.g. redundancy in the time domain if there is a similarity of the destination address identifier for successive data packets. In order to remove such a redundancy in the time domain as well, there is preferably a feedback from the routing unit to the compressor unit used for compressing the destination address identifier so as to eliminate such a time domain redundancy and consider the similarity of a plurality of destination address identifiers within a data packet sequence.

Although the present invention can preferably be used for the routing of IPv6 data packets, the present invention is not limited to this preferred field of application and, as a matter of course, can be used for all kinds of data packets.

BRIEF DESCRIPTION OF THE DRAWINGS

In the following, preferred embodiments of the present invention will be explained in more detail with reference to the enclosed drawings.

FIG. 3 shows an example for a code table for the address compressor shown in FIG. 2, FIG. 4 shows an example for a hexadecimal address to be processed by the address compressor according to the code table shown in FIG. 3, FIG. 5 shows a table illustrating the test results of a test concerning the compression ratio of different IPv6 address tables.

DETAILED DESCRIPTION

In practice, much redundancy may be involved in the destination address identifier to be processed by an IP router. To explore how much redundancy may be involved in an IP address, an experiment was carried out that tested, with various address tables, how many bits are really necessary to represent the information included in a quad, i.e. 4 bits, of an IPv6 address.

Figure 6:
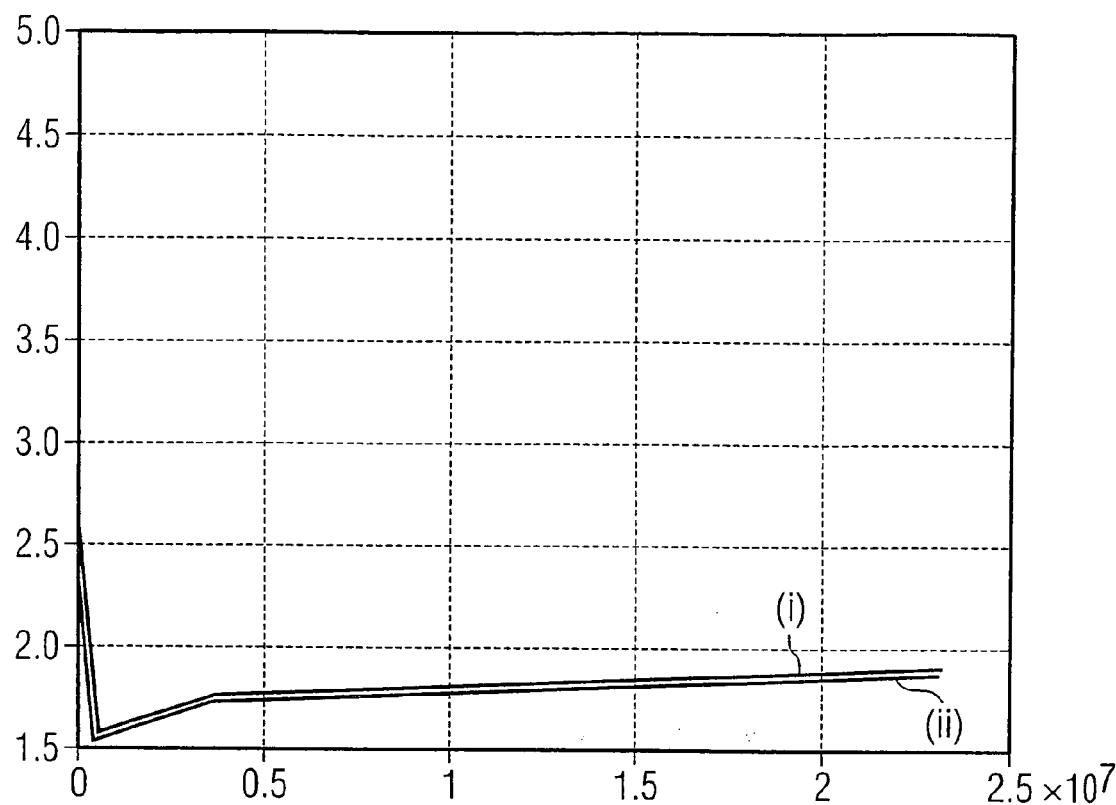
FIG. 6 shows the dependence of the number of averaged bits and the number of entropy bits per byte in an IPv6 address.

In FIG. 6, the result of the test is shown in dependence upon the IPv6 address table size. A graph (i) shows the result of the test if a respective 4 bit-quad of an IPv6 address is compressed by using a Huffman encoder, i.e. graph (i) shows the number of averaged bits, which are obtained after the Huffman coding, depending on the address table size. In addition, a graph (ii) shows the number of entropy bits per quad depending on the address table size. That is to say graph (ii) shows the theoretical result, i.e. the number of bits which are really necessary to carry the information of the quad. From FIG. 6 it can be seen that, instead of 4 bits, the necessary bit number varies between 1.5 and 2. As the address table size exceeds $3 \times 10^6$, the number of bits which are really necessary to carry the respective address information reaches a stable value of about 1.8. This means a compression potential of approximately (at least) 50%. It is to be noted that in this experiment only the redundancy of appearance distribution of some symbols (bit combinations) in an address identifier was taken into account. This corresponds to a kind of spatial redundancy. There can still be other kinds of redundancy, for example a redundancy in the time domain if there is a significant similarity of the address identifiers for some data packets which are to be processed one after the other.

It is not easy for a general look-up method to consider all kinds of redundancy completely. The approach described in the following in detail, however, makes it possible to combine the routing table look-up technique with a data compression technique. While the former technique is associated with a searching operation in a compact address table, the latter technique deals with all possible kinds of redundancy. By combining the advantages of both techniques, an optimum solution for the routing table look-up problem can be achieved.

Figure 1:
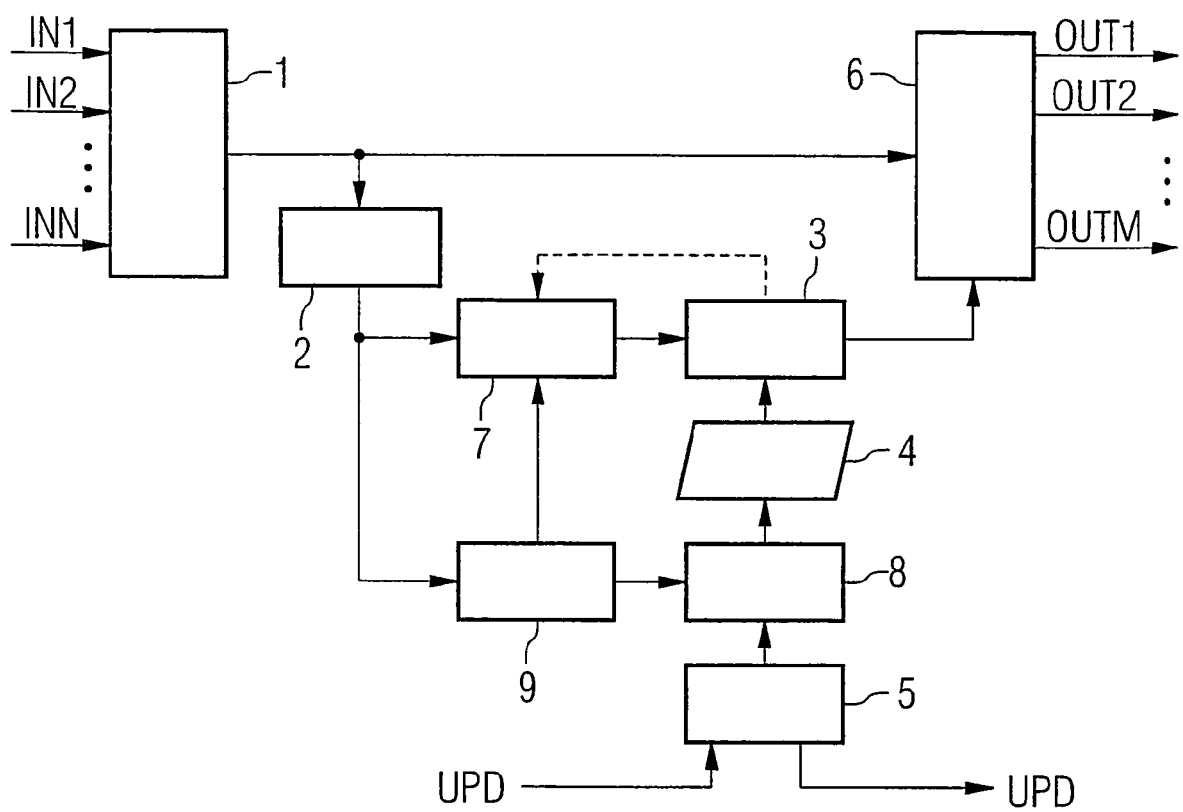
FIG. 1 shows schematically an IP router according to a preferred embodiment of the present invention.

FIG. 1 shows the structure of an IP router according to a preferred embodiment of the present invention. Those components which correspond to the components shown in FIG. 7 and having already been described before are indicated with the same reference signs as in FIG. 7. In order to avoid repetitions reference can be made to the description with respect to FIG. 7.

Figure 7:
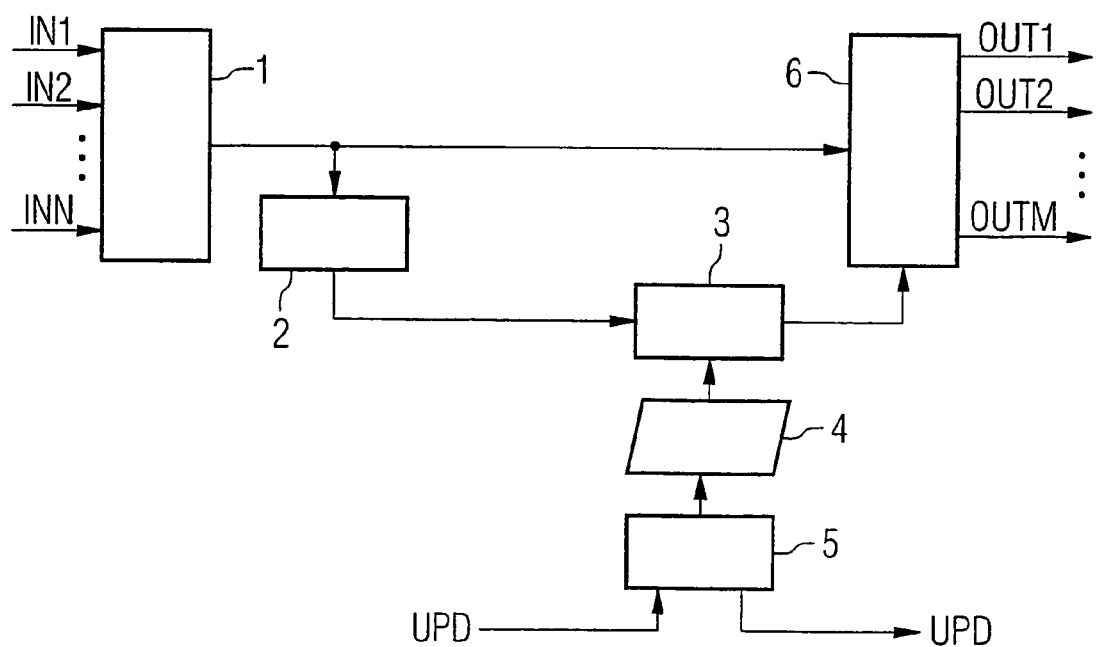
FIG. 7 shows schematically an IP router according to the prior art.

The IP router of FIG. 1 differs from that shown in FIG. 7 in that the IP router works in a compressed address domain. A first address compressor 7 is arranged in the path between the header extracting block 2 and the routing unit 3. This address compressor 7 translates the destination address identifier provided by the header extracting block 2, which comprises 128 bits for an IPv6 destination address identifier, for example, into an in average shorter form using a data compression algorithm. The compressed destination address identifier is then forwarded to the routing unit 3 and used as the key for the look-up operation with respect to the routing table 4. In addition, an identical address compressor 8 is arranged in the path between the block 5 generating and updating the routing table 4 and the routing table 4. Hence, the address compressor 8 stores the forwarding address information in a compressed form in the routing table 4 using the same data compression algorithm as the address compressor 7. Thus, the routing table 4 is provided in a very compact form and, in particular, the routing table 4 is consistent with the compressed destination address identifier output by the address compressor 7 and used as the key for the look-up operation by the routing unit 3. The routing unit 3 may use conventional methods for searching for a correspondence between the compressed destination address identifier and one of the compressed forwarding addresses stored in the routing table 4.

The data compression algorithm used by the address compressors 7, 8 is particularly a so-called lossless data compression algorithm. Such a lossless data compression algorithm eliminates redundancy in the respective data without sacrificing any information content. There are several popular algorithms and variants of them which could be used for such a lossless data compression. The most important examples are the data compression algorithms of the Huffman, Arithmetic, and Lempel-Ziv (LZ) family.

Since the compression efficiency depends on the data characteristics of the destination address identifiers that the router deals with, at least some of the parameters of the address compressors 7, 8, e.g. the code table used by the address compressor, should be assigned or adjusted according to or in dependence upon these data characteristics. Therefore, the IP router shown in FIG. 1 comprises a compressor parameter block 9 which collects this information on the data characteristics of the respective destination address identifier from the header extracting block 2 and calculates the compression parameters for the data compression algorithm used by the address compressors 7 and 8.

As already described above, the address compression effected by the address compressors 7, 8 takes into account the redundancy of the appearance distribution of some symbols (bit combinations) in the respective destination address identifier. However, there can be another kind of redundancy in terms of the similarity of the destination address identifiers of a plurality of successive data packets. In order to eliminate such a redundancy in the time domain as well, the IP router according to FIG. 1 comprises a feedback connection from the routing unit 3 to the address compressor 7 used for compressing the destination address identifiers. Such a feedback from the routing unit 3 to the address compressor 7 allows to take into account the similarity of the destination address identifiers within a data packet sequence. This can be done, for example, by determining the forwarding address for the switch 6 on the basis of a forwarding address having been determined before in case the new destination address identifier, for which the forwarding address is to be determined by the routing unit 3, is very similar to the respective preceding destination address identifier.

Figure 2:
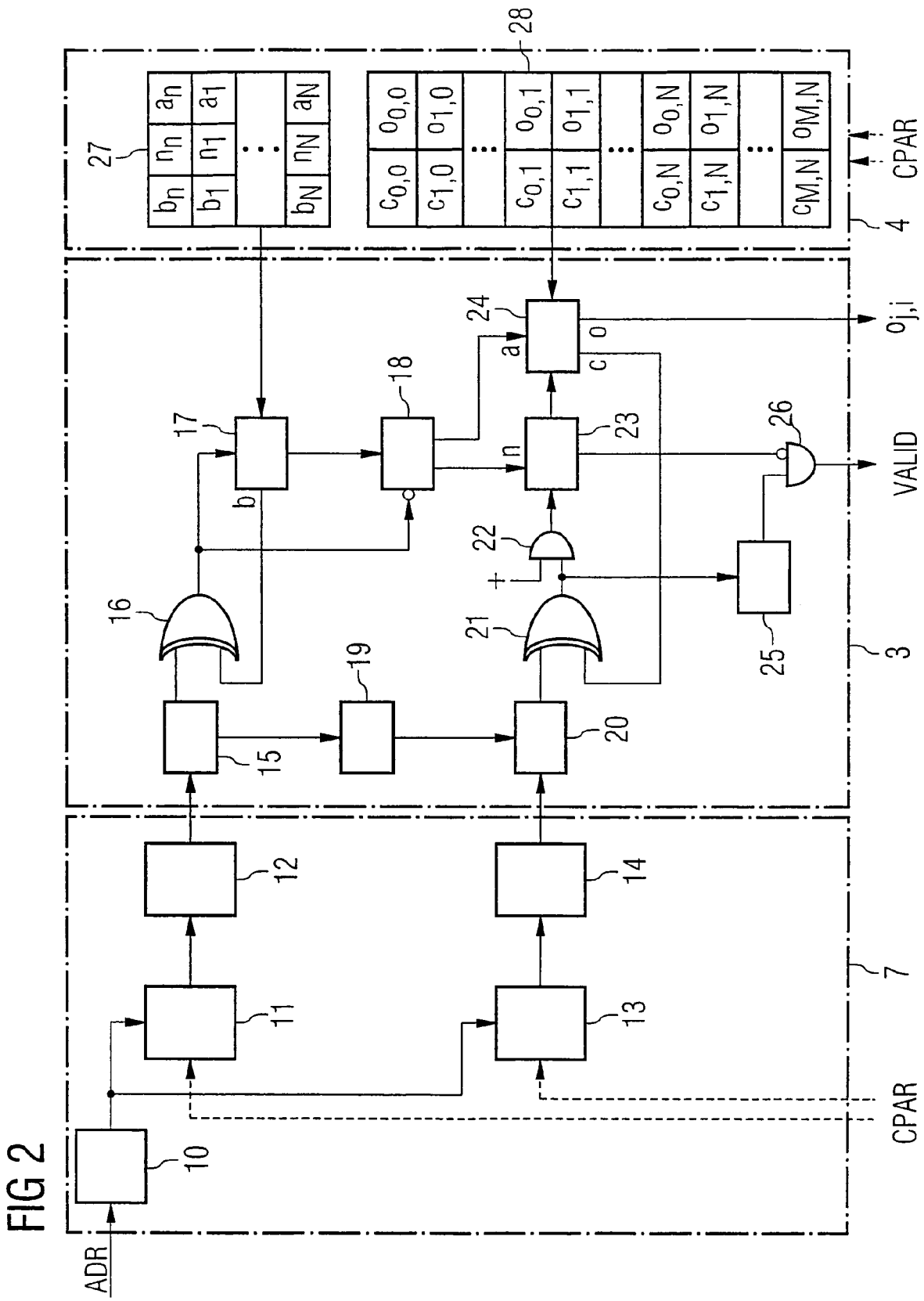
FIG. 2 shows an implementation example for an address compressor, a routing unit and a routing table shown in FIG. 1, using a Huffman data compression algorithm.

FIG. 2 shows an implementation example for the address compressor 7, the routing unit 3, and the routing table 4 shown in FIG. 1. In particular, this implementation example corresponds to an architecture for processing IPv6 data packets. Although FIG. 2 shows a hardware diagram of the respective components, as a matter of course, the proposed architecture can be implemented with different hardware in software or in a combination of hardware and software as well.

The address compressor 7 shown in FIG. 2 receives an extracted destination address identifier ADR from the header extracting block 2 shown in FIG. 1. In the case of an IPv6 data packet, this destination address identifier ADR comprises 128 bits which are divided into 32 4 bit-quads by a block 10. Each quad is then translated into a code word comprising several bits using for example a code table shown in FIG. 3. This is done by a coding block 13.

The code table shown in FIG. 3 comprises a first column (A) listing all possible hexadecimal values of a quad comprising 4 bits. In a second column (B), the respective binary code assigned to each quad value is depicted. In addition, in a column (C) the code length for each code word is depicted.

The 32 code words output by the coding block 13 are then combined by an address composing block 14 so as to obtain the compressed destination address which is then buffered in a first buffer 20 of the routing unit 3. In addition, there is a block 11 storing the respective code word length table corresponding to column (C) of FIG. 3, and a block 12 sums up the code word lengths output by the block 11 for the respective address identifier ADR. The result is then buffered in a second buffer 15. Hence, the buffer 15 stores the sum of the length of the code words for the respective destination address identifier ADR, i.e. the length of the compressed address identifier, while the buffer 20 stores the combination of the code words assigned to the respective destination address identifier ADR, i.e. the compressed destination address identifier. The result stored in the buffer 15 is calculated by the block 12 on the basis of column (C) shown in FIG. 3, while the result stored in the buffer 20 is determined by the block 14 on the basis of column (B) shown in FIG. 3.

FIG. 4 shows an example for a destination address identifier ADR to be compressed in accordance with the code table shown in FIG. 3. According to the code table of FIG. 3, this address is compressed to 56 bits. Each "F" value results in 1 bit of the compressed address, each "E" value results in 1 bit of the compressed address, each "D" value results in 3 bits of the compressed address, the "B" value results in 5 bits of the compressed address, the "7" value also results in 5 bits of the compressed address, the "4" value results in 6 bits of the compressed address, and the "3" value also results in 6 bits of the compressed address. Hence, the compressed address determined according to the code table shown in FIG. 3 comprises 22×1=22 bits for all "F" values, 1×6=6 bits for the "4" value, 1×5=5 bits for the "B" value, 1×6=6 bits for the "3" value, 1×5=5 bits for the "7" value, 3×1 =3 bits for all "E" values and 3×3=9 bits for all "D" values of the input destination address. Thus, the compressed address comprises 56 bits in total.

The code table shown in FIG. 3 is generated by the compressor parameter block 9 shown in FIG. 1 which outputs the compressor parameters CPAR used by the blocks 11, 13 of the address compressor 7 shown in FIG. 2. In particular, the code table of FIG. 3 corresponds to a code having been implemented by a Huffman encoder. In the present case, the Huffman encoder assigns to each symbol (quad) a code word that has a length which is inversely proportional to the appearance probability of the respective symbol in an IPv6 address table comprising 872640 entries (13962240 bytes). The implementation of such a Huffman encoder, either in software or in hardware, can be found in many documents and publications dealing with data compression. Therefore, a detailed description of such a Huffman encoder or of the construction of the compressor parameter block 9, which is implemented with a Huffman encoder, is not considered necessary.

The routing table 4 shown in FIG. 2 is composed of possible forwarding addresses that are compressed with the same compression parameters CPAR, i.e. the same code tables as those used by the address compressor 7. These compressed forwarding addresses are arranged in sub-tables according to their length. The compressed address length $b_0$-$b_N$, the number of entries $n_0$-$n_N$, and the base address $a_0$-$a_N$ of each sub-table are stored in a leading table 27. The routing unit 3 works to find a match for the compressed input destination address in the compressed routing table 4. This is effected as follows:

A block 17 reads an entry of the leading table 27 and sends the address length bi thereof to a length comparator 16. The length comparator 16 compares the length of the compressed input address as stored in the buffer 15 with each entry read out by the block 17. The length comparator 16 compares the length of the compressed input address with each address length $b_i$ stored in the leading table 27 so as to find the corresponding sub-table. If a match is found by the length comparator 16, a block 18 is reset, and thereafter the block 18 sends the base address $a_i$ of the found sub-table to a block 24 and initializes a counter 23 to the number of entries $n_i$ of the respective sub-table for the following address look-up operation.

Then, the routing unit 3 compares the compressed input address itself, as stored in the buffer 20, with the compressed address $c_{j,i}$ stored in the sub-table as determined by the above-described search operation. A block 24 reads an entry from the respective sub-table 28 and sends the address $c_{j,i}$ to an address comparator 21. This address comparator 21 compares the compressed input address stored in the buffer 20 with the compressed forwarding address provided by the block 24. With each comparison operation effected by the address comparator 21, an AND gate 22 decrements the counter 23. Therefore, the comparison operation of the address comparator 21 is repeated until a correspondence is found between the compressed destination address and one of the compressed forwarding addresses stored in the sub-table 28, or until the counter 23 is decremented to zero. An 1 bit-latch 25 holds the latest comparison results of the address comparator 21. If there is a correspondence between the compressed input destination address and one of the compressed forwarding addresses stored in the sub-table 28, the 1 bit-latch 25 generates a signal for a logic gate 26, which effects a logic AND operation between the output signal of the 1 bit-latch 25 and an inverted output signal of the counter 23. This output signal of the counter 23 has a low level as long as the counter 23 has not reached the value zero. Hence, the output signal VALID of the logic gate 26 indicates whether the output port number or output link number $o_{j,i}$ currently processed by the block 24 is valid and can be used for the forwarding operation of the switch 6 (see FIG. 1). It should be noted that the index "i" indicates the number of the respective sub-table, while the index "j" indicates the number of the respective entry within a sub-table.

A further block 19 of the routing unit 3 effects a byte alignment operation of the coded or compressed input address, which is stored in the buffer 20, by zero padding of the remaining bits.

According to the implementation example shown in FIG. 2, each destination address identifier ADR is divided up into 4 bit-symbols. However, as a matter of course, the destination address identifier may also be divided up in a different manner. In addition, the code table shown in FIG. 3 is determined only by considering the appearance probability of the respective symbols (quads) in a given address table, in the present case in an IPv6 address table. However, the appearance probability of the symbols at the router input can also be considered in order to improve the performance of the IP router. Finally, as already indicated above, the present invention is by no means limited to Huffman codes. Any lossless data compression algorithm can be used as a basis for the implementation of the address compressors 7, 8, the routing unit 3 and the routing table 4.

The model of using compressed destination address identifiers and compressed forwarding addresses was tested using a plurality of IPv6 address tables of various sizes. FIG. 5 illustrates the test result. Column (A) indicates the number of the respective IPv6 address table, column (B) contains the number of entries of the respective IPv6 address table, column (C) contains the original sizes (bytes) of the IPv6 address table, column (D) contains the compressed sizes (bytes) of the IPv6 address table, and column (E) indicates the compression ratio (%) which could be achieved. As can be seen, the required size of the routing table can be reduced dramatically. This leads to an improved performance of the IP router and helps to save memory and power for the look-up operation. The test result coincides with the theoretical analysis of FIG. 6.

The invention claimed is:

1. A method for routing of data packets, comprising the steps:
   (a) extracting a destination address identifier from a data packet to be forwarded,
   (b) compressing the destination address identifier using a compression algorithm,
   (c) comparing the compressed destination address identifier with forwarding addresses available for routing, which forwarding addresses have been compressed using the compression algorithm and stored as entries of a routing table,
   (d) if a positive comparison between the compressed destination address identifier and an entry stored in the routing table is found in step (c), then switching the data packet to an output link associated with the forwarding address corresponding to the entry, and
   wherein each entry of the routing table comprises a compressed forwarding address and an output link number, and that, if a positive comparison between the compressed destination address identifier and a compressed forwarding address in an entry stored in the routing table is found, the data packet is switched to an output link associated with the output link number in the entry.

2. The method according to claim 1, wherein the compression algorithm comprises a lossless data compression algorithm.

3. The method according to claim 2, wherein the lossless data compression algorithm is selected from a group comprising Huffman algorithms, Arithmetic algorithms, and Lempel-Ziv algorithms.

4. The method according to claim 1, further comprising adjusting at least one parameter of the data compression algorithm in dependence upon data characteristics of the destination address identifier.

5. The method according to claim 1, wherein step (c) further comprises comparing the compressed destination address identifier with entries of the routing table taking into account a similarity between the compressed destination address identifier and a compressed destination address identifier of a preceding data packet.

6. The method according to claim 1, wherein step b) further comprises compressing the destination address identifier using a code table that associates a code word to a symbol of the destination address identifier and to a symbol of each forwarding address, respectively.

7. The method according to claim 6, wherein each symbol of the destination address identifier and each symbol of a forwarding address, respectively, comprises a plurality of bits of the destination address identifier and a plurality of bits of the forwarding address, respectively.

8. The method according to claim 7, wherein each symbol of the destination address identifier and each symbol of the forwarding addresses comprises four successive bits of the destination address identifier and the forwarding address, respectively.

9. The method according to claim 6, wherein step b) further comprises compressing the destination address identifier using the code table that associates the code word to the symbol of the destination address identifier, the length of each code word being inversely related to an appearance probability of a corresponding symbol in the code table.

10. The method according to claim 6, wherein step b) further comprises compressing the destination address identifier using the code table that associates the code word to the symbol of the destination address identifier, the length of each code word being inversely related to an appearance probability of a corresponding symbol in the destination address identifier of an input data packet.

11. The method according to claim 1, wherein step (a) further comprises extracting the destination address identifier from an Ipv6 data packet to be forwarded.

12. A routing apparatus for routing of data packets, comprising:
- a first data compressor configured to receive a destination address identifier of a data packet to be forwarded and to generate a compressed destination address identifier therefrom,
- a routing table store configured to store a plurality of forwarding addresses available for routing, each forwarding address having been compressed according to a compression algorithm as used in the first data compressor and having been stored as an entry of the routing table store,
- a routing unit configured to compare the compressed destination address identifier with the compressed forwarding addresses stored in the routing table store so as to find a correspondence between the compressed destination address identifier and one of the entries of the routing table store,
- a switch configured to switch the data packet to an output link associated with a forwarding address corresponding to the entry for which a correspondence has been found with the compressed destination address identifier, and
- wherein each entry of the routing table comprises a compressed forwarding address and an output link number, and that, if a positive comparison between the compressed destination address identifier and a compressed forwarding address in an entry stored in the routing table is found, the data packet is switched to an output link associated with the output link number in the entry.

13. The routing apparatus according to claim 12, further comprising a second data compressor configured to compress the forwarding addresses according to said data compression algorithm.

14. The routing apparatus according to claim 12, wherein the first data compressor is configured to use a lossless data compression algorithm.

15. The routing apparatus according to claim 14, wherein the first data compressor is configured to use a data compression algorithm being selected from a group comprising Huffman algorithms, Arithmetic algorithms, and Lempel-Ziv algorithms.

16. The routing apparatus according to claim 12, further comprising a compression parameter adjuster configured to adjust at least one parameter of the first data compressor in dependence upon data characteristics of the destination address identifier.

17. The routing apparatus according to claim 12, wherein the routing unit is operably connected to provide feedback information to the first data compressor.

18. A routing apparatus for routing of data packets, comprising:
- extraction means for extracting a destination address identifier from a data packet to be forwarded,
- routing table storing means for storing a plurality of forwarding addresses available for routing, each of the plurality of forwarding addresses having been compressed according to a data compression algorithm and having been stored as an entry of the routing table_storing means,
- a routing unit for comparing the destination address identifier with the entries stored in the routing table storing means for finding a correspondence between the destination address identifier and one of the forwarding addresses, and
- switch means for switching the data packet to an output link associated with the respective forwarding address matching the destination address identifier,
- wherein first data compression means are provided for compressing the destination address identifier extracted by the extraction means according to said data compression algorithm,
- wherein second data compression means are provided for compressing the forwarding addresses according to said data compression algorithm and storing the compressed forwarding addresses as entries in the routing table storing means, the routing unit being configured such that it compares the compressed destination address identifier with the compressed forwarding addresses stored in the routing table storing means, and
- wherein each entry of the routing table comprises a compressed forwarding address and an output link number, and that, if a positive comparison between the compressed destination address identifier and a compressed forwarding address in an entry stored in the routing table is found, the data packet is switched to an output link associated with the output link number in the entry.

19. The routing apparatus according to claim 18, wherein the first and second data compression means are configured such that they use a lossless data compression algorithm.

* * * * *

UNITED STATES PATENT AND TRADEMARK OFFICE
CERTIFICATE OF CORRECTION

| | | |
|---|---|---|
| PATENT NO. | : 8,046,487 B2 | Page 1 of 1 |
| APPLICATION NO. | : 10/524311 | |
| DATED | : October 25, 2011 | |
| INVENTOR(S) | : Jagannathan et al. | |

It is certified that error appears in the above-identified patent and that said Letters Patent is hereby corrected as shown below:

In the Claims:

Col. 9, line 10, Claim 11: replace "lpv6" with --Ipv6--

Col. 10, lines 17-18, Claim 18: replace "routing table_storing means" with --routing table storing means--

Signed and Sealed this
Twentieth Day of May, 2014

Michelle K. Lee
*Deputy Director of the United States Patent and Trademark Office*